(12) United States Patent
Wilczek et al.

(10) Patent No.: US 6,246,968 B1
(45) Date of Patent: Jun. 12, 2001

(54) DEVICE FOR PIN ADJUSTING IN SENSORS

(75) Inventors: Klaus Wilczek; Volker Topp, both of Werne (DE)

(73) Assignee: AB Eletronik GmbH, Werne (DE)

( * ) Notice: Subject to any disclaimer, the term of this patent is extended or adjusted under 35 U.S.C. 154(b) by 0 days.

(21) Appl. No.: 09/101,914

(22) PCT Filed: Nov. 19, 1997

(86) PCT No.: PCT/EP97/06462

§ 371 Date: Nov. 16, 1998

§ 102(e) Date: Nov. 16, 1998

(87) PCT Pub. No.: WO98/22781

PCT Pub. Date: May 28, 1998

(30) Foreign Application Priority Data

Nov. 20, 1996 (DE) ............................................. 196 47 897

(51) Int. Cl.⁷ ...................................................... G06F 3/06
(52) U.S. Cl. .......................... 702/104; 702/85; 702/91; 702/107
(58) Field of Search .................... 73/1.75, 494; 324/132, 324/174, 74, 115; 330/272; 361/130, 87; 702/104, 91; 123/107; 323/207; 340/870.37; 29/608; 137/554; 318/599; 177/25.13

(56) References Cited

U.S. PATENT DOCUMENTS

| | | | |
|---|---|---|---|
| 4,364,027 | * 12/1982 | Murooka | 340/347 |
| 4,581,714 | * 4/1986 | Reid | 364/571 |
| 4,608,657 | * 8/1986 | Manome et al. | 364/571 |
| 4,663,586 | * 5/1987 | Swerlein et al. | 324/115 |
| 4,796,354 | * 1/1989 | Yokoyama et al. | 29/608 |
| 4,845,649 | * 7/1989 | Eckardt et al. | 364/571.02 |
| 5,016,198 | * 5/1991 | Schreiber | 364/550 |
| 5,308,930 | * 5/1994 | Tokutu et al. | 177/25.13 |
| 5,604,684 | * 2/1997 | Juntunen | 364/571.04 |
| 5,609,184 | * 3/1997 | Apel et al. | 137/554 |
| 5,771,180 | * 6/1998 | Culbert | 364/557 |

FOREIGN PATENT DOCUMENTS

| | | |
|---|---|---|
| 9408516 | 9/1994 | (DE) . |
| 4445378 | 6/1996 | (DE) . |

* cited by examiner

Primary Examiner—Kamini Shah
Assistant Examiner—Carol S. W. Tsai
(74) Attorney, Agent, or Firm—Milde, Hoffbert & Macklin, LLP

(57) ABSTRACT

In order to enable frequent and easy adjustment of a physical quantity transformed by a sensor into starting values or curves, the following method is applied: a) the modifying unit keeps adjustment data on a temporary memory (55) through the output pin (OUT), and a working unit (54) gives at the output pin (OUT) the starting value and curves as modified; b) once the starting values and curves have found their adjustment position, the adjustment data are stored by the modifying unit (52) in a permanent memory (53).

12 Claims, 10 Drawing Sheets

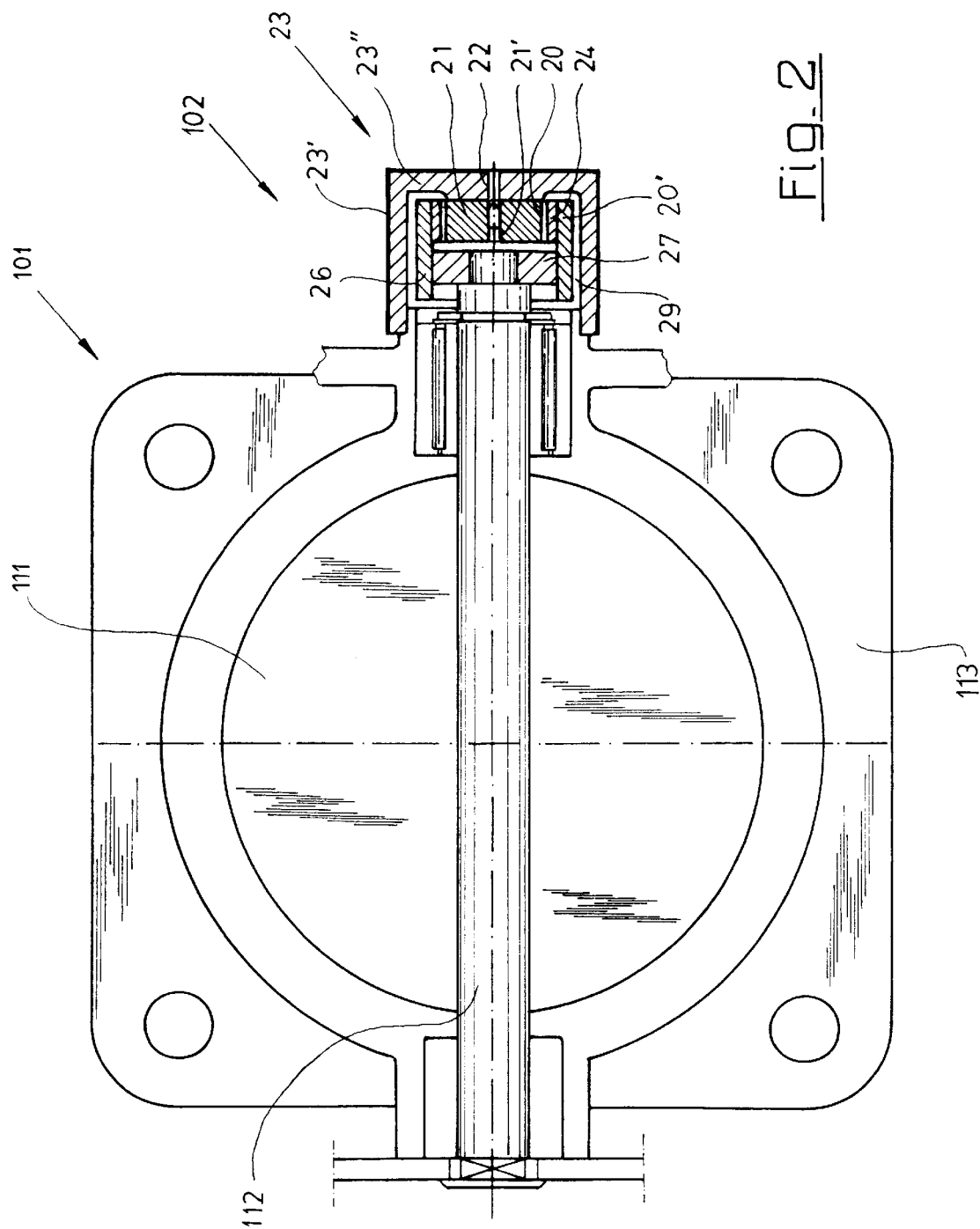

DEVICE FOR PIN ADJUSTING IN SENSORS

BACKGROUND OF THE INVENTION

The present invention concerns a device for adjusting a physical dimension transformed into outputs or output curves by a sensor.

A sensor for measuring physical dimensions and a method of adjusting it are known from the German Patent Publication No. A 3,446,248. This particular sensor is a pressure sensor, and a processing circuit that calculates the precise measurement is employed along with it. The sensor is combined with a constant-value memory into a single component. The memory stores values employed to correct measurement signals emitted by the sensor. Several points at which the sensor is to measure the dimensions travel in succession over a test bench. The signal emitted by the sensor is employed as an actual value in a comparator. Corrections are obtained in the form of deviations between the actual and reference values and stored in the component's memory.

There is a drawback to this procedure. The corrections can be obtained and stored only while the sensor component is open. Once they have been obtained and stored, a data-and-address bus is removed from the memory and the component is coupled to insulation. The address-and-data input terminals are no longer accessible. The encapsulation makes it necessary to re-adjust the already corrected test signals, which can no longer be corrected.

An angle-of-rotation sensor is known from the German Patent Publication No. U 9,408,516 (corresponding to PCT/EP94/03825). It is stationary and includes at least one stator and a rotor that rotates around the stator. The stator is in two parts with a gap between them. The gap accommodates an electromagnetic component, particularly a Hall-effect component, that emits a voltage representing the angle of rotation.

A speed-of-rotation sensor is known from the German Patent Publication No. A 4,445,378. It emits rectangular pulses representing the position of a shaft from stationary to the highest permissible rated speed. The standstill output signal is emitted in response to comparison of an incoming signal that represents magnetic flux density with a threshold signal.

The two latter approaches have drawbacks. The sensor voltages and thresholds are adjusted with variable resistors. The resistors, however, can be varied only while the sensor is open. If the sensor is inside some sort of vessel, it cannot be re-adjusted.

SUMMARY OF THE INVENTION

The principal object of the present invention is accordingly to provide an improved device of the aforesaid type that can be employed to adjust as often and easily as desired a physical dimension transformed into outputs or output curves by a sensor, even when the sensor is encapsulated.

This object is attained in a device of the aforesaid type in accordance with the present invention by providing a device which comprises the following elements:

an operating stage;

a permanent memory;

an altering component connected to the operations stage by way of the permanent memory and directly to the operations stage;

a temporary memory that parallels the permanent memory and is connected to the altering component and the operations stage; and an output component;

wherein the operations stage is mounted on the sensor, a connector strip with at least one output pin is mounted on the altering component, and the output pin is connected to the output component, and wherein the outputs or output curves produced by the operations stage are adjusted such that:

a) the altering component temporarily stores adjustment data in the temporary memory by way of the output pin and the data are processed by the operations stage to emit altered outputs or output curves by way of the output component's output pin, and b) if the outputs or output curves have attained their adjusted state, the altering component enters the adjustment data in the permanent memory.

The present invention has several advantages. An encapsulated sensor can be adjusted by programming its pins. The requisite and desired adjustments can be carried out by way of the output pin. This means that the programming does not necessitate an extra pin, but exploits one that is already there. Furthermore, the sensors can be adjusted not only during manufacture, but later and on-site. It accordingly becomes possible to adjust the sensor to specific applications. When the overall situation and application change, even much later, the sensor can still be re-adjusted. Data obtained while the pin is being programmed can be permanently retained with no need to revalue over the life of the sensor.

The adjustment data can be employed to vary the timing frequencies or voltage steps in an angle-of-rotation sensor.

Programmed adjustment is comparable to fine adjustment of virtual or actual component with respect to slope or sensor-voltage output angle. The timing frequency is similarly virtually increased and decreased in accordance with the particular application.

The adjustment data can alternatively be employed to vary voltage levels in order to adjust the threshold of a standstill signal in a speed-of-rotation sensor. In this event as well, the procedure can be compared to the fine adjustment of a virtual trimming resistors.

The output stage can be a series comprising a signal-transforming component and an output terminal, the signal-transforming component being connected to the operations logic and the output terminal to the output pin.

Various embodiments of the signal-transforming component are possible.

The signal-transforming component can be a digital-to-analog converter with an amplifier downstream. In this case, the data are emitted digital and transformed for further processing by known means.

The signal-transforming component can also be a series circuit comprising a galvanically separated switch, especially an optical coupler, a reference stage, and a comparator. This is embodied in a bicycle-pedal module kick-down switch. The optical coupler ensures galvanic separation.

The varying component can comprise at least one central processing unit (CPU) or digital processor. The digital processor can be a module in the form of a regular computer. The computer can be a single-chip computer.

The operations stage can include a series circuit comprising a pre-amplifier, an offset amplifier connected to an offset digital-to-analog converter, a switching condenser stage, a sample-and-hold component, an amplifier connected to a gain-bit digital-to-analog converter, a performance-curve limiter, a terminal stage, and a clock generated connected to the pre-amplifier in the switching condenser stage and to the sample-and-hold component.

If the sensor is an angle-of-rotation sensor, as noted above, the pre-amplifier can be connected to its Hall-effect component. If the sensor is a speed-of-rotation sensor, the sensor comparator can be connected to the pre-amplifier.

The clock can be connected to the Hall-effect component.

A source of voltage or current can be included upstream of the Hall-effect component. Such a source can also be positioned upstream of the sensor comparator.

Adjustment data can be supplied to the pre-amplifier in the form of rough-adjustment levels, to the offset amplifier in the form of rough bits, to the amplifier in the form of fine-adjustment levels, and to the performance-curve limiter in the form of performance-curve limiting bits.

This particular embodiment of the operations stage allows precise fine adjustment. It also ensures the output of precisely adjusted data unaltered and continuous.

For a full understanding of the present invention, reference should now be made to the following detailed description of the preferred embodiments of the invention as illustrated in the accompanying drawings.

BRIEF DESCRIPTION OF THE DRAWINGS

FIG. 1b illustrates a signal-transforming component for the pin adjustor illustrated in FIG. 1a.

FIG. 1c illustrates another embodiment of an output stage for the pin adjustor in FIG. 1a.

FIG. 2 is a schematic, partly sectional, illustration of a throttle assembly connected to an angle-of-rotation sensor.

DESCRIPTION OF THE PREFERRED EMBODIMENT

Figure 1A:
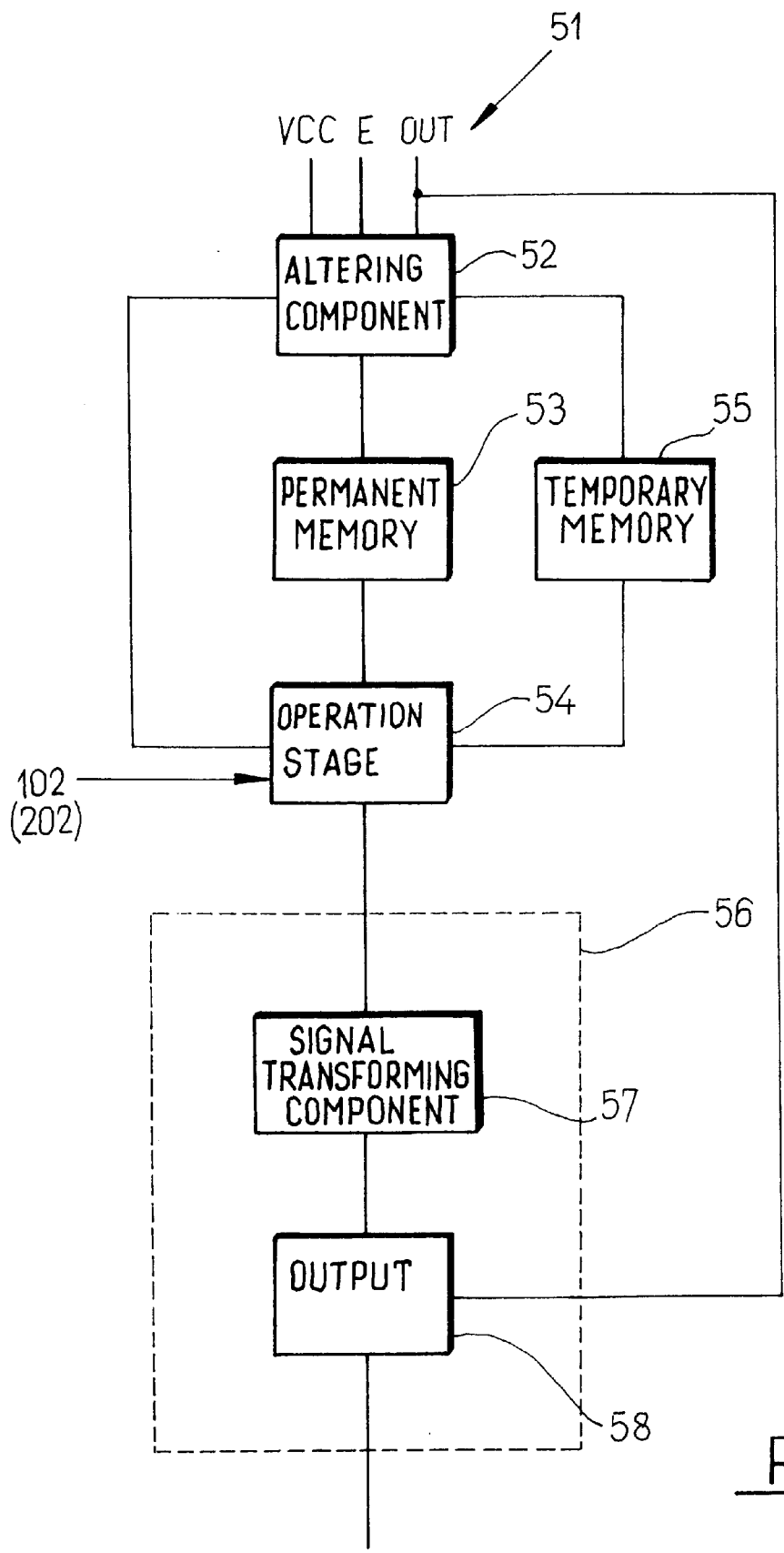
FIG. 1a is a block diagram of a pin adjustor for angle-of-rotation and speed-of-rotation sensors.

The preferred embodiments of the present invention will now be described with reference to FIGS. 1–10 of the drawings. Identical elements in the various figures are designated with the same reference numerals.

Figure 1B:
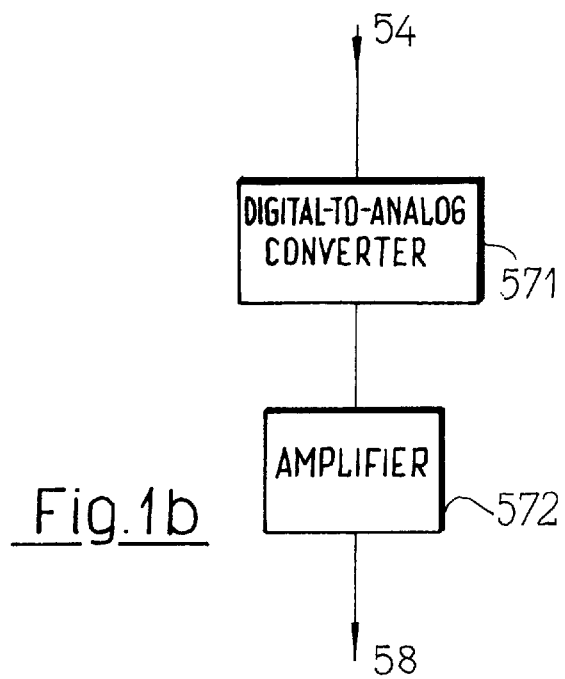
Figure 1C:
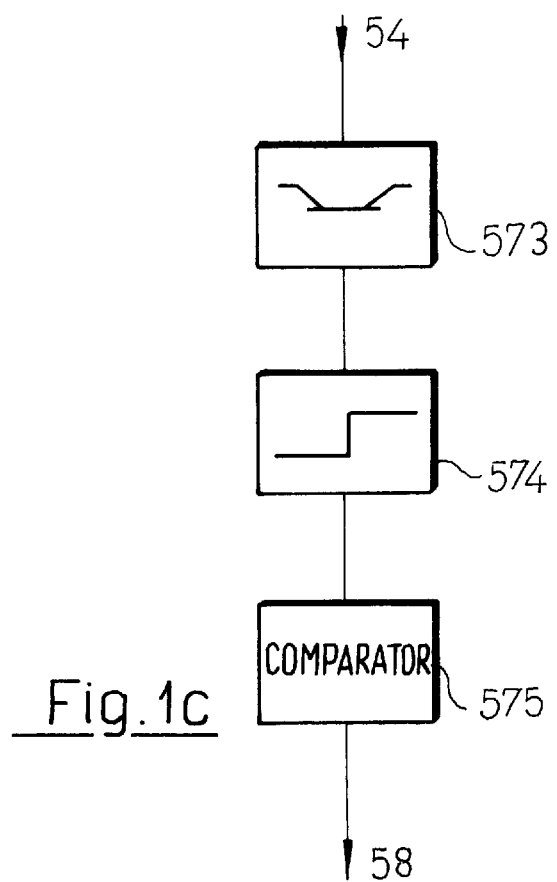

FIGS. 1a through 1c are block diagrams of a pin adjustor. It is in the form of a series circuit comprising an altering component 52, a permanent memory 53, an operations stage 54, and an output stage 56.

Paralleling permanent memory 53 is a temporary memory 55. Temporary memory 55 is connected to altering component 52 and to operations stage 54. Altering stage 52 is also directly connected to operations stage 54. Operations stage 54 is in contact with either an angle-of-rotation sensor 102 or a speed-of-rotation sensor 202.

Output stage 56 is a series comprising a signal-transforming component 57 and an output component 58.

Attached to altering component 52 is a connector strip 51 with at least one voltage pin VCC, a ground pin E, and an output pin OUT. Output pin OUT is connected to output component 58. Altering component 52 is a digital processor or single-chip computer with a central processing unit containing an adjustment-and-operating program.

The signal-transforming component 57 illustrated in FIG. 1b is series comprising a digital-to-analog converter 571 and an amplifier 572.

The signal-transforming component 57 illustrated in FIG. 1c is a series circuit comprising an optical coupler 573, a reference-voltage component 574, and a comparator 575.

A comparator could also be employed instead of amplifier 572.

The essence of the present invention is that pin-programmed adjustment of an angle-of-rotation or speed-of-rotation sensor, especially one that has been encapsulated, can be undertaken with the output pin OUT alone and in the absence of a special programming pin.

How the components illustrated in FIGS. 1a through 1c operate in conjunction with an angle-of-rotation sensor 102 or speed-of-rotation sensor 202 will now be specified.

The angle-of-rotation sensor 102, known from the aforesaid German Patent Publication No. U 9,408,516 will first be described. Angle-of-rotation sensor 102 is connected to a throttle assembly 101.

FIG. 2 illustrates a throttle assembly 101 connected to a angle-of-rotation sensor 102.

The throttle assembly comprises a butterfly valve 111 mounted on a shaft 112 in a housing 113.

Angle-of-rotation sensor 102 comprises a stationary component 20 and a rotating component 20'.

A linear magnetic flux is ensured by a stator 21, consisting of two half-round and mutually facing stator halves beveled at the edges. Between the two halves is a gap 21'.

The stator halves are accommodated in an essentially cylindrical housing 23 and sidewall 23 with a base 23".

There is an essentially groove-shaped depression in the base 23".

The depression 21 and gap 21' match in width over considerable extent. Gap 21' accommodates an electromagnetic component in the form of a Hall-effect component 22.

Component 20', which rotates around the accordingly structured stationary component 20, includes an annular magnet 24 secured by a magnet holder 26 and 27. Magnet holder 26 and 27 comprises a cylindrical magnet-holder component 26 and a spacing disk 27 that can be inserted into and accommodated in it. Spacing disk 27 is directly attached to butterfly-valve shaft 112. A gap 29 is left between spacing disk 27 and stator 21 when housing 23 is fastened to butterfly-valve housing 113, Magnet-holder component 26 will accordingly constitute in conjunction with the annular magnet 24 accommodated inside it and with spacing disk 27 a rotor that can rotate protected inside stator housing 23.

Figure 6:
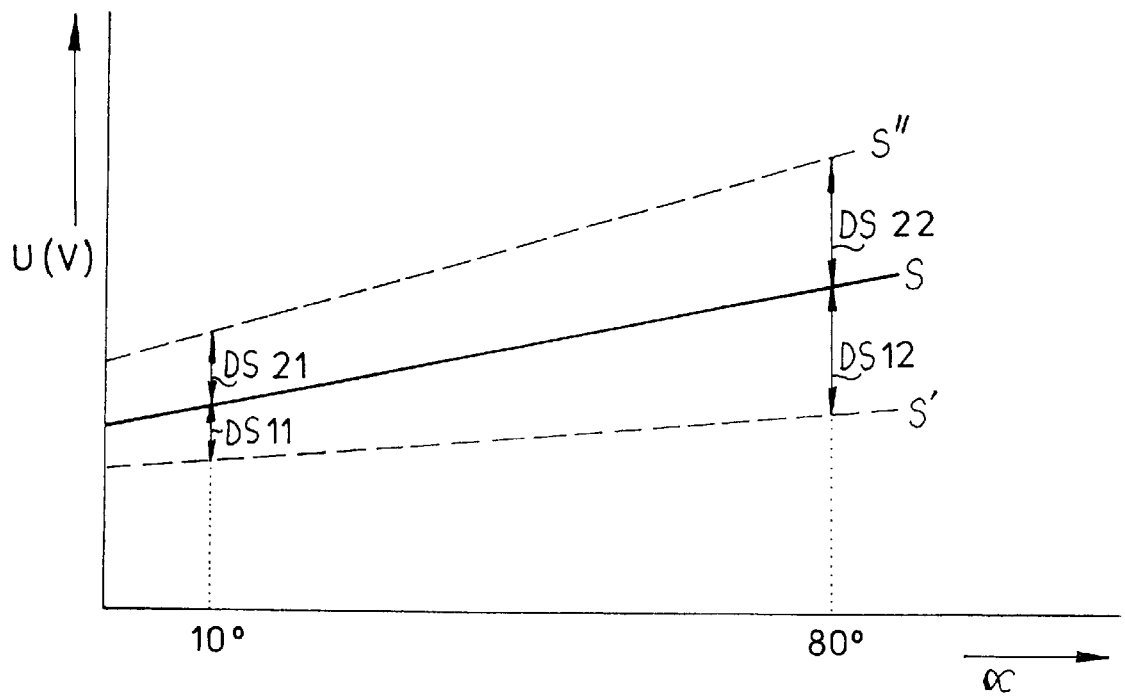
FIG. 6 is a graph of sensor voltages in the angle-of-rotation sensor illustrated in FIG. 2 employed with the pin adjustor illustrated in FIGS. 1a through 1c and FIG. 3.

Hall-effect component 22 emits an unadjusted sensor voltage S', illustrated in the graph in FIG. 6, which represents voltage U as a function of angle α of rotation. Sensor voltage S' can be adjusted by the pin adjustor connected to angle-of-rotation sensor 102.

Figure 3:
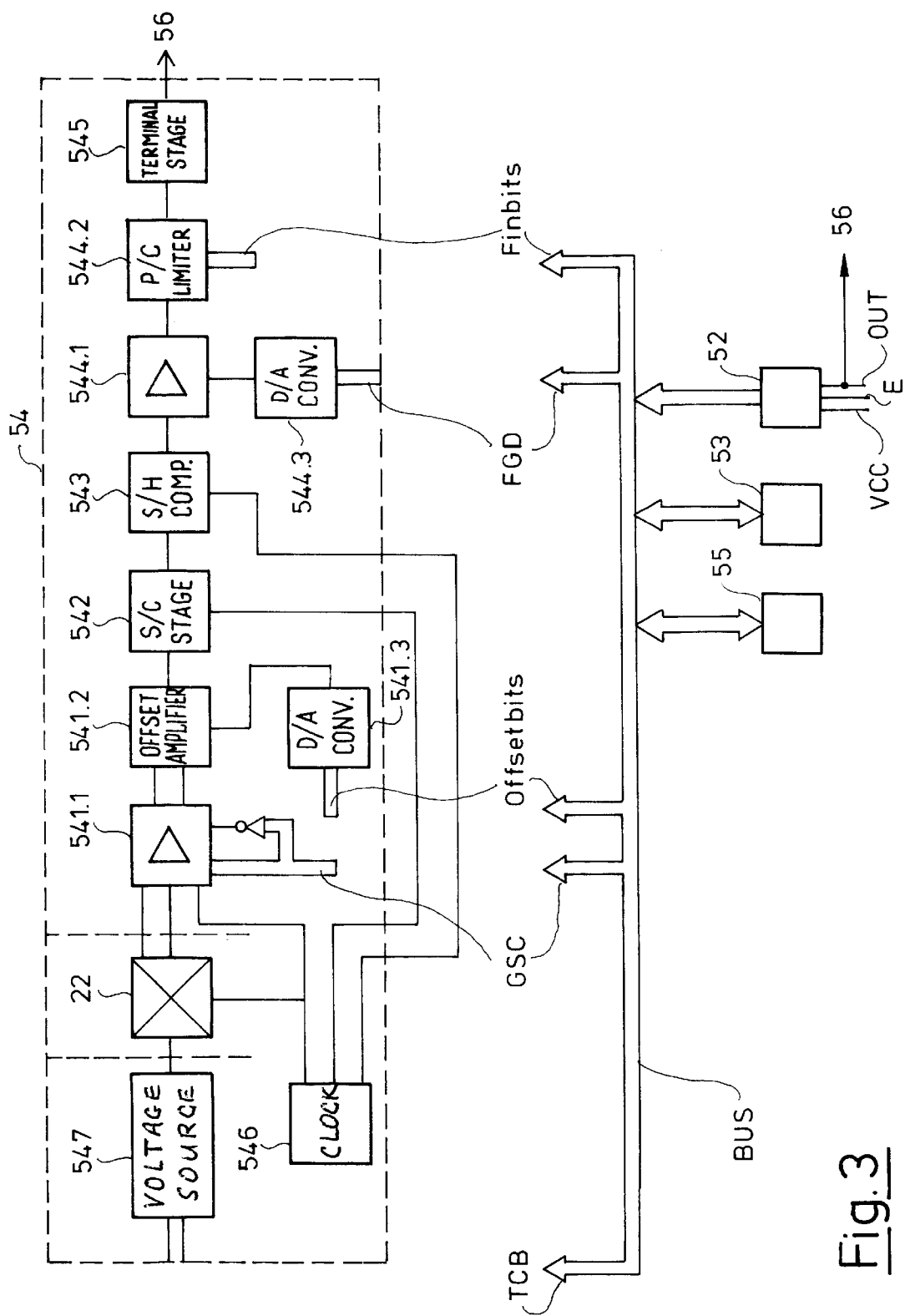
FIG. 3 is a schematic block diagram of the operations stage of the pin adjustor in FIG. 1a as employed in the angle-of-rotation sensor illustrated in FIG. 2.

FIG. 3 is a block diagram of operations stage 54. Operations stage 54 is confronted by altering component 52, permanent memory 53, and temporary memory 55. The other connections leading out of output stage 56 are represented by the arrow.

Upstream of Hall-effect component 22 is a source 547 of voltage. Source 547 is associated with a temperature-compensation component. The temperature-compensation component emits a voltage that compensates for any differences between the temperature coefficient of Hall-effect component 22 and that of the outside atmosphere. This is particular important in that, when angle-of-rotation sensor 102 is employed in a vehicle, it is exposed to considerable fluctuations in heat.

Downstream of source 547 of voltage and its associated temperature-compensation component is a series of components comprising a pre-amplifier 541.1, an offset amplifier 541.2 connected to an offset digital-to analog converter 541.3, a switching condenser stage 542, a sample-and-hold component 543, an amplifier connected to a gain-bit digital-to-analog converter, a performance-curve limiter 544.2, and a terminal stage 545.

Switching condenser stage 542 automatically compensates Hall-effect component 22.

Sample-and-hold component 543 temporarily stores voltages while the next voltage is being generated.

Associated with operations stage 54 is a clock unit 546. Clock 546 is connected to Hall-effect component 22, preamplifier 541.1, switching condenser stage 542, and sample-and-hold component 543.

Altering component 52, permanent memory 53, and temporary memory 55 are connected to a bus assembly BUS. Bus assembly BUS can conventionally include a data bus, and address bus, and a controls bus. It can also, in specific cases, be strictly a data bus.

Branching out of bus assembly BUS is a rough-adjustment level GSC that extends to pre-amplifier 541.1. Next to rough-adjustment level GSC is a rough-bits offset-bits branch that extends to offset digital-to-analog converter 541.3 which controls the offset amplifier 541.2.

Also branching out of bus assembly BUS is a fine-adjustment level FGD that extends to the gain-bit digital-to-analog converter 544.3 which controls the amplifier 544.1. Next to it a fine-bit fin-bit branch that extends to performance-curve limiter 544.2.

Rough-adjustment level GSC constitutes, with its rough-bits offset bits, a rough-adjustment component. The adjacent fine adjustment level FGD on the other hand constitutes, with its fin-bits performance-curve limiting bits, a fine-adjustment component.

Bus assembly BUS can also be provided with a temperature-coefficient bits branch TCB that exploits the temperature gradient of source 547 of voltage for example to control altering component 52.

How sensor voltage S' is adjusted will now be specified. Adjustment data are forwarded to temporary memory 55 from output pin OUT and altering component 52. Initially, a rough adjustment of two to four bits, three bits for example, is carried out with rough-adjustment level GSC and rough-bits offset-bits between eight and fifteen bits, ten bits for example. This is followed by successive fine adjustments with fine adjustment level FGD between seven and fourteen bits, nine bits for example, and the fin-bits performance-curve limiting bits between one and four bits, two bits for example. Altering component 52 ensures that the data for rough and fine adjustment can be obtained from temporary memory 55.

Figure 4A:
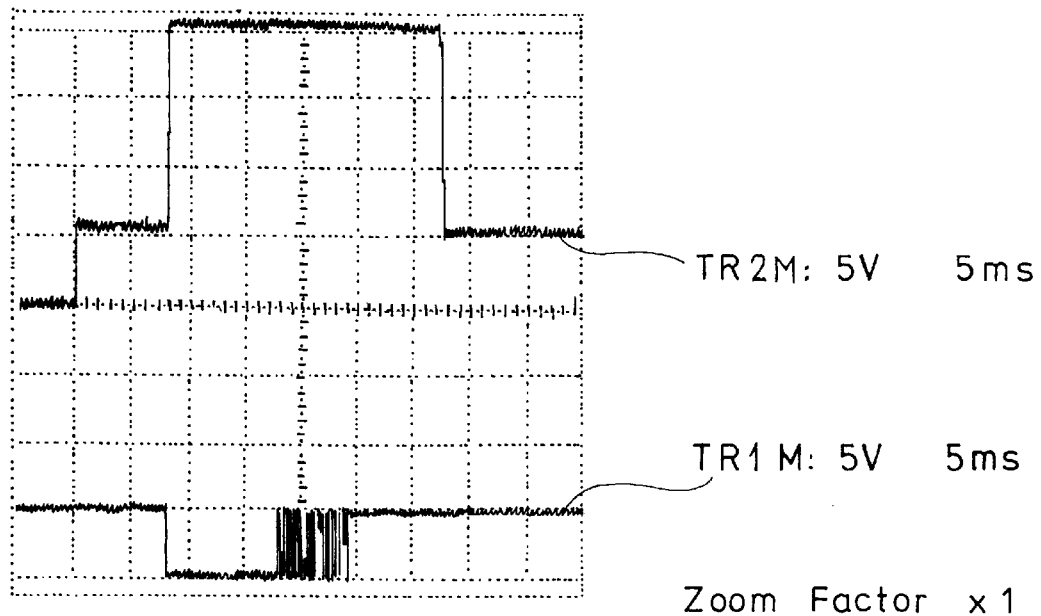
FIG. 4a illustrates temporary entry into the operations stage illustrated in FIG. 3.
Figure 4B:
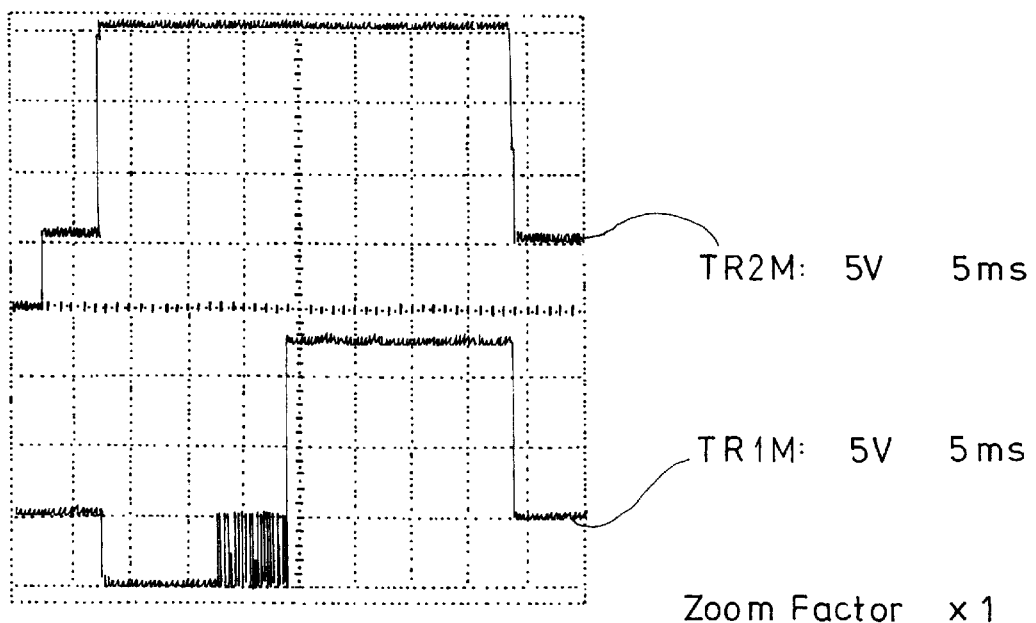
FIG. 4b illustrates permanent entry into the operations stage illustrated in FIG. 3.
Figure 5:
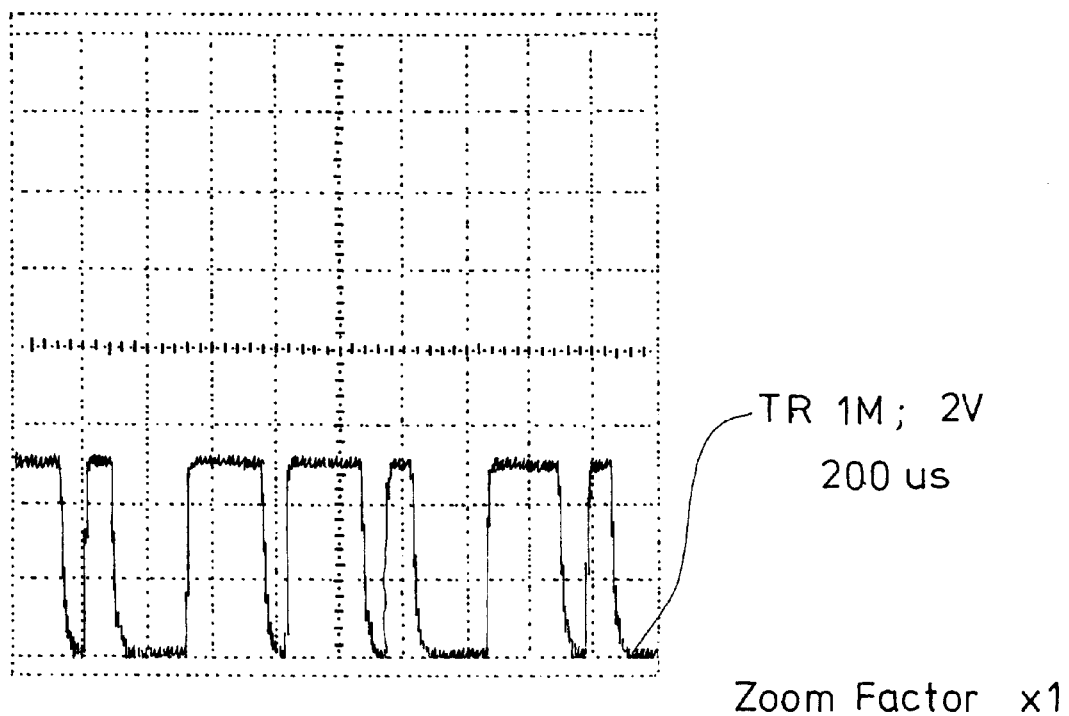
FIG. 5 is a graph of the sequence of bits in the operations stage illustrate in FIG. 3.

FIG. 4a illustrates how altering component 52 writes into temporary memory 55. A Hall voltage S22, voltage TR1M, from Hall-effect component 22 is raised by the aforesaid GSC-offset bits adjustment data and by the FGD-fin bits by means of a voltage increase TR2M. These levels are obtain from temporary memory 55 in accordance with the entry procedure ("zapping") illustrated in FIG. 4b and entered into permanent memory 53. FIG. 5 illustrates a similar bit sequence for the TR1M signal by way of example.

The entry of additional adjustment data increases sensor voltage S to level S. At 10° and 80°, sensor voltage S has been increased in relation to sensor voltage S' by differences DS11 and DS12. As adjustment proceeds, the sensor voltage can be increased to a level S", where the voltage differences at 10° and 80° will be DS21 and DS22.

If protocolar processing of the adjustments indicates that sensor voltage S corresponds to the rated performance curve, its adjustment data will be transferred from temporary memory 55 to permanent memory 53 by altering component 52. Permanent memory 53 can be a ROM, PROM, EEPROM, or other type of read-only memory. Temporary memory 55 on the other hand can be a RAM or similar read-and-write memory.

Angle-of-rotation sensor 102, once adjusted by the pin adjustor, will in the course of operation engage the rough-bits offset-bit and fine-bits fin-bits in permanent memory 53 in the form of adjustment data. Offset amplifier 541.2, switching condenser stage 542 and sample-and-hold component, and performance-curve limiter 544.2 in particular will ensure that the entered bits are converted to a constant voltage level that is continuously added to the emitted sensor voltage S" (S22). If the emitted sensor voltage on the other hand equals sensor voltage S", the voltage level will be continuously subtracted from it until the desired level S is attained.

To illustrate how the components illustrated in FIGS. 1a through 1c operate in conjunction with speed-of-rotation sensor 202, the sensor will be now specified in detail with reference to the German Patent Publication No. A 4,445,578.

Figure 7:
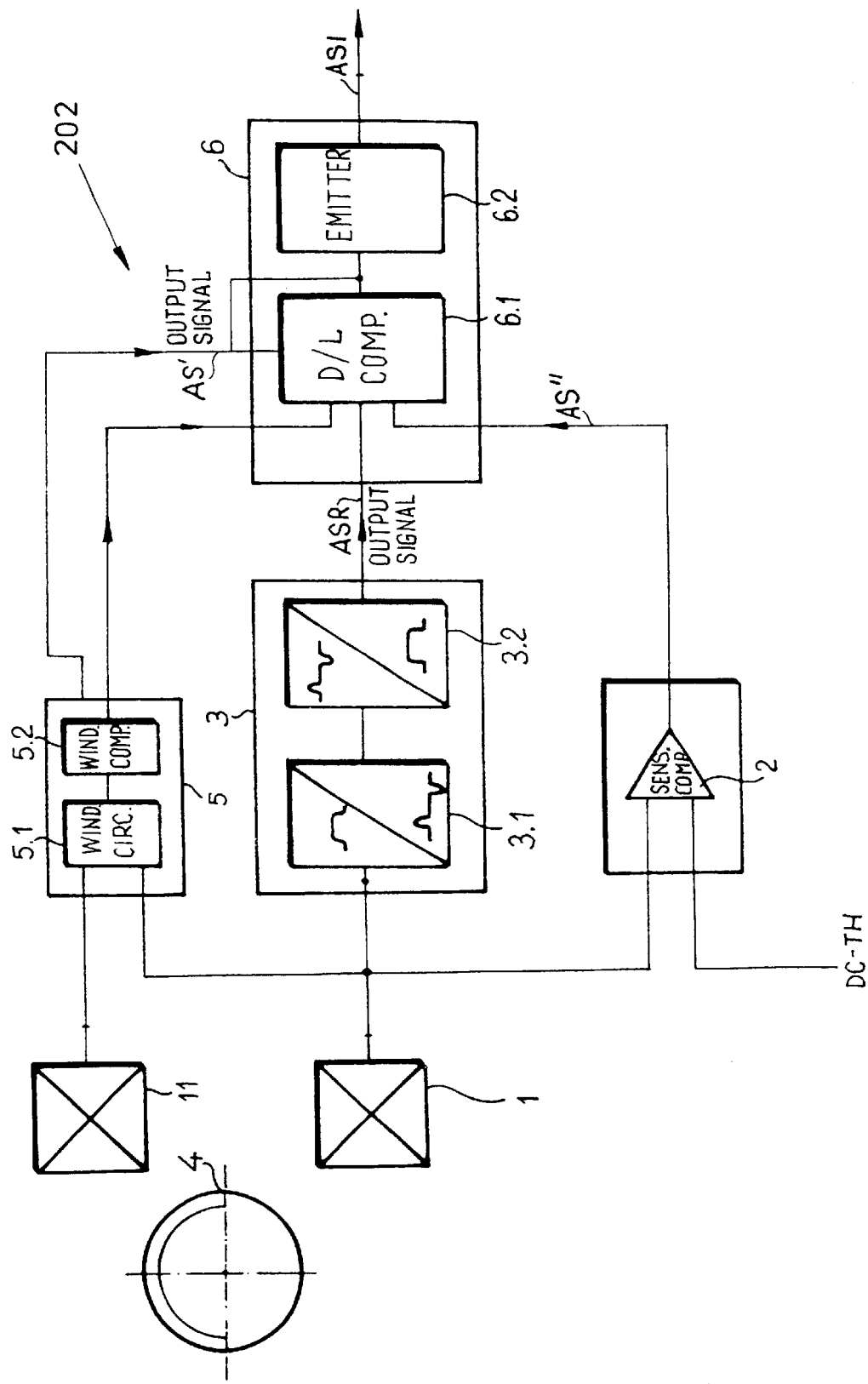
FIG. 7 is a block diagram of a device for detecting the angle of a rotating shaft.
Figure 8:
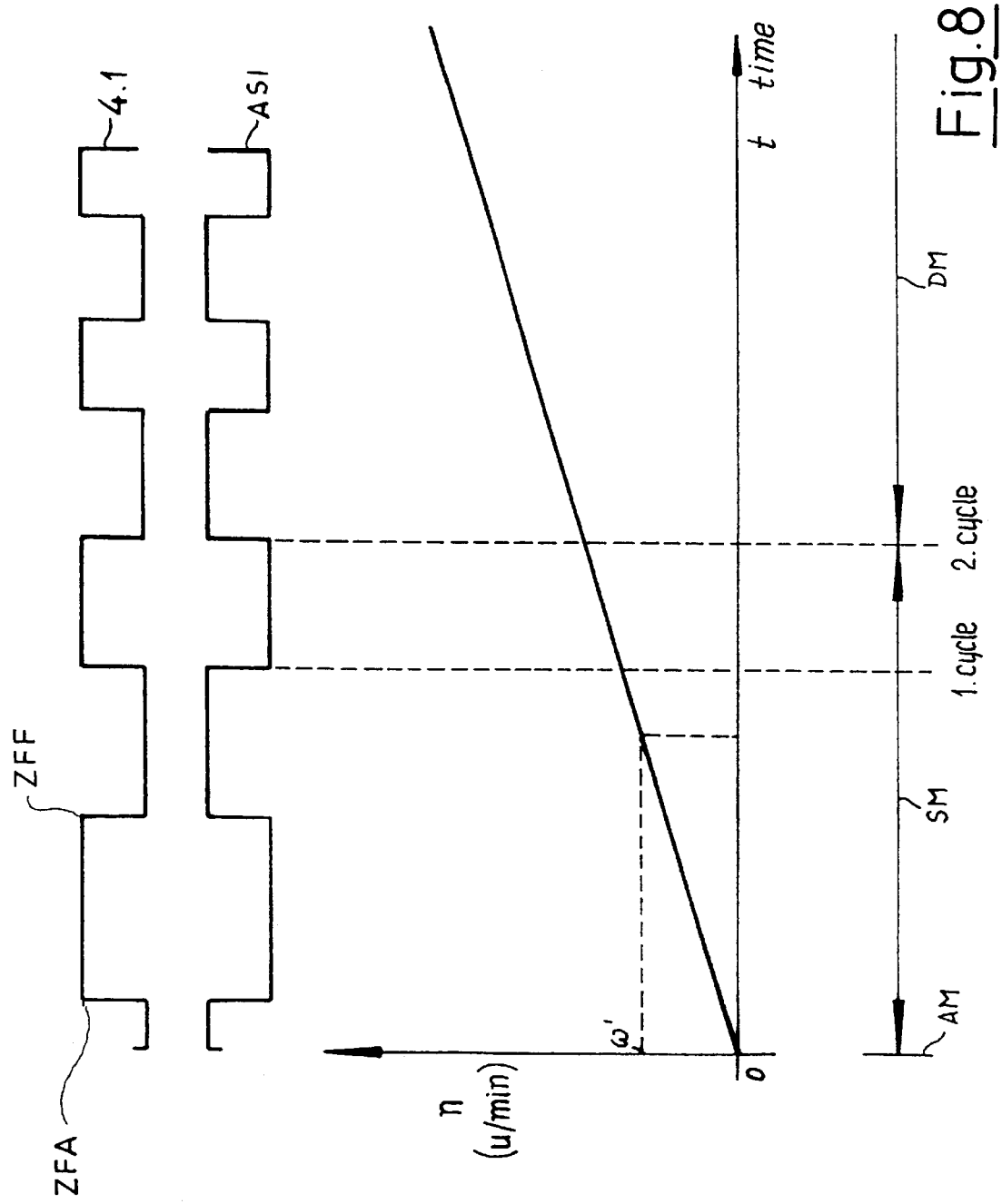
FIG. 8 represents various switching procedures that occur in the device illustrated in FIG. 7.

The branches in speed-of-rotation sensor 202 will now be specified with reference to FIGS. 7 and 8.

A. The Standstill Branch:
This branch comprises a Hall cell 1 and a sensor comparator 2. It operates, as illustrated in FIG. 8 in starting mode AM and emits a standstill signal AS".

B. The Static Branch:
This branch comprises Hall cell 1 along with another Hall cell 11 and a window-signal component 5 consisting of a series comprising a window circuit 5.1 and a window comparator 5.2. Operating during static mode SM, it emits a static output signal AS'.

C. The Dynamic Branch:
This branch combines Hall cell 1 with a dynamic output circuit 3. Dynamic output circuit 3 consists of a series comprising a differentiator and a point-of-inflection detector 3.2 and emits an output signal ASR during the dynamic mode DM.

D. The Interference-Pulse Suppression Branch:
This branch comprises Hall cells 1 and 11, window-signal component 5, and an emitter 6, which consists of a series, a decision-logic component 6.1, and an emitter 6.2. It emits a position output signal ASI.

A pulse-generating wheel rotates upstream of Hall cells 1 and 11. As the wheel unwraps, with its rotation per unit of time increasing, it produces the curve 4.1 in FIG. 8. The more rapidly the wheel rotates, the more rapid is the passage of its cogs and gaps by the Hall cells. The cogs have a rising edge ZFA and a descending edge ZFF.

Sensor comparator 2 is the "standstill" component. It compares the result obtained from Hall cell 1 with a direct-current threshold signal DC-Th. Threshold signal DC-THE is limited by an upper voltage level UHZ and by a lower voltage level UHZL. It creates, as will be evident from FIG. 9, a switching window SF, bounded at the top by an uppermost gap Hall voltage UHZLmax and a lowermost gap Hall voltage UHZLmin.

Figure 9:
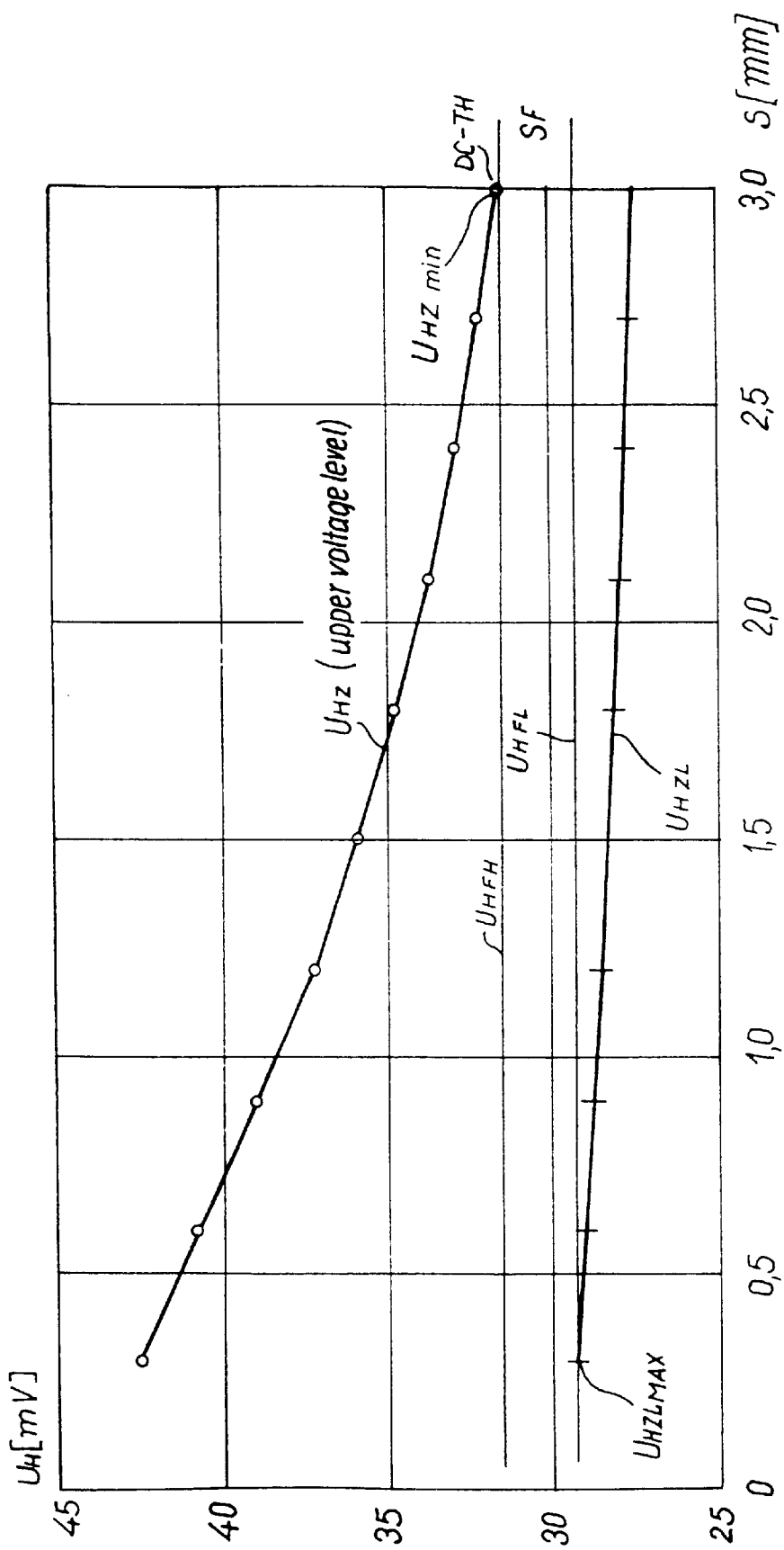
FIG. 9 is a graph of the switching window for a threshold signal over the Hall voltage from a pulse-emitting wheel.

FIG. 9 illustrates cog Hall voltage UHZ and gap Hall voltage UHZL. Lowermost cog Hall-voltage level UHZmin demarcates uppermost switching-window level UHFH and uppermost gap Hall-voltage UHZLmax the lowermost switching-window level UHFL.

How switching window SF can be established between the two Hall voltages will now be specified.

Altering logic 52 shifts, through its output pin OUT, operations stage 54 into the adjustment state. Operations stage 54 is constructed as illustrated in FIG. 3. Adjustment data in the form of rough-bits offset-bits and fine-bits fin-bits are now entered into the temporary memory by way of output pin OUT. The data are converted into appropriate voltage signals that shift switching window SF to a position between lowermost cog Hall voltage UHZmin and uppermost gap Hall voltage UHZLmax. Neither Hall-voltage curve is modified. The result is a threshold signal DC-CH that will ensure the precision of the curve representing the incoming signal AS", which is then emitted at the output terminal of sensor comparator 2. This procedure will establish the standstill output signal AS" of position signal ASI so precisely that it will reveal the position of the stationary shaft, which is coupled with pulse-generating wheel 4.1, extremely accurately.

Once switching window SF is in its adjustment state, the adjustment data rough-bits offset-bits and fine-bits fin-bits will be entered in permanent memory 53. Once the entry is complete, altering component 52 will select operations stage 54 and switch to adjusted long-term operation.

The switching window SF for threshold signal DC-TH in another embodiment is stationary. In this event, the Hall-voltage curves are displaced by the rough-bits offset-bits and fine-bits fin-bits such that lowermost cog Hall voltage UHZmin is above uppermost switching-window level UHFH and uppermost gap Hall voltage UHZLmax is below lowermost switching-window voltage level UHFL. Using fine-bits fin-bits allows the most precise adjustment. Once the adjustment state has been attained. These data are entered into permanent memory 53 and the adjusted operation of speed-of-rotation sensor 202 will commence.

It is of the essence of the present invention that the pin-programmed adjustment of switching window SF is undertaken once speed-of-rotation sensor 202 is ready. The effects of other components and of other interference can be taken into account during adjustment. This will eliminate rigid "accident" adjustment, and the speed-of-rotation sensors can emit the most precise ASI signals in accordance with the particular application.

If the signal-transforming component 57 illustrated in FIG. 1c is employed, ASI output signals from operations logic 54 can be forwarded to optical coupler 573. The signal constructed by optical coupler 573 will be forwarded to reference-voltage component 574 and compared with the establish reference voltage. Once the established level has been attained, the output from reference-voltage component 574 is switched to "high". This output signal is then forwarded to output pin OUT through output component 58.

It is of the essence of the present invention that the switching system illustrated in FIG. 1b constitutes an electronic kick-down switch for vehicle-pedal modules. It is a substitute for mechanical kick-down switches. A particular advantage is that the electronic kick-down switch is integrated into the sensor. Optical coupler 573 ensures that the switch is galvanically separate.

There has thus been shown and described a novel device for pin adjusting in sensors for sensors which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Apparatus for adjusting a physical dimension transformed into outputs or output curves by a sensor, said apparatus comprising, in combination:

an operating stage;

a permanent memory;

an altering component connected to the operations stage by way of the permanent memory and directly to the operations stage;

a temporary memory that parallels the permanent memory and is connected to the altering component and the operations stage; and an output component;

wherein the operations stage is mounted on the sensor, a connector strip with at least one output pin is mounted on the altering component, and the output pin is connected to the output component, and wherein the outputs or output curves produced by the operations stage are adjusted such that:

a) the altering component temporarily stores adjustment data in the temporary memory by way of the output pin and the data are processed by the operations stage to emit altered outputs or output curves by way of the output component's output pin, and b) if the outputs or output curves have attained their adjusted state, the altering component enters the adjustment data in the permanent memory.

2. The apparatus defined in claim 1, wherein the adjustment data are employed to vary the timing frequencies or voltage steps in an angle-of-rotation sensor.

3. The apparatus defined in claim 1, wherein the adjustment data are employed to vary voltage levels in order to adjust the threshold of a standstill signal in a speed-of-rotation sensor.

4. The apparatus defined in claim 1, wherein the output component is a series circuit comprising a signal-transforming component and an output terminal, the signal-transforming component being connected to the operations logic and the output terminal to the output pin.

5. The apparatus defined in claim 4, wherein the signal-transforming component is a digital-to-analog converter with an amplifier downstream.

6. The apparatus defined in claim 4, wherein the signal-transforming component is a series circuit comprising a galvanically separated switch, especially an optical coupler, a reference stage, and a comparator.

7. The apparatus defined in claim 1, wherein the altering component comprises at least one central processing unit or digital processor.

8. The apparatus defined in claim 1, wherein the operations stage includes a series comprising a preamplifier, an offset amplifier connected to an offset digital-to-analog converter, a switching capacitor stage, a sample-and-hold component, an amplifier connected to a gain-bit digital-to-analog converter, a performance-curve limiter, a terminal stage, and a clock generator connected to the pre-amplifier in the switching capacitor stage and to the sample-and-hold component.

9. The apparatus defined in claim 8, wherein the preamplifier is connected to the Hall-effect component of an angle-of-rotation sensor or to the sensor comparator of a speed-of-rotation sensor.

10. The apparatus defined in claim 8, wherein the clock generator is connected to the Hall-effect component.

11. The apparatus defined in claim 8, wherein a source of voltage or current with temperature compensation is included upstream of the Hall-effect component.

12. The apparatus defined in claim 8, wherein adjustment data are supplied to the pre-amplifier in the form of rough-adjustment levels to the offset amplifier in the form of rough bits, to the amplifier in the form of fine-adjustment levels, and to the performance-curve limiter in the form of performance-curve limiting bits.

* * * * *